(12) United States Patent
Wang

(10) Patent No.: US 9,069,991 B2
(45) Date of Patent: Jun. 30, 2015

(54) FLAT PANEL DISPLAY WITH DISPLAY SIGNAL INPUT SOCKET HAVING SAFEGUARDING TERMINAL

(75) Inventor: Jian-Feng Wang, Shenzhen (CN)

(73) Assignees: INNOCOM TECHNOLOGY (SHENZHEN) CO., LTD., Shenzhen (CN); INNOLUX CORPORATION, Miao-Li County (TW)

(*) Notice: Subject to any disclaimer, the term of this patent is extended or adjusted under 35 U.S.C. 154(b) by 1796 days.

(21) Appl. No.: 12/152,069

(22) Filed: May 12, 2008

(65) Prior Publication Data

US 2008/0282361 A1 Nov. 13, 2008

(30) Foreign Application Priority Data

May 11, 2007 (CN) .......................... 2007 1 0074429

(51) Int. Cl.
*G06F 1/26* (2006.01)
*G06F 21/88* (2013.01)
*G08B 13/12* (2006.01)

(52) U.S. Cl.
CPC .............. *G06F 21/88* (2013.01); *G08B 13/128* (2013.01)

(58) Field of Classification Search
CPC ................................. G06F 21/86; G06F 21/57
USPC .......................................................... 726/34
See application file for complete search history.

(56) References Cited

U.S. PATENT DOCUMENTS

| 6,312,270 | B1 | 11/2001 | Hamon |
| 7,409,566 | B1* | 8/2008 | Diab ............................. 713/310 |
| 2003/0159056 | A1* | 8/2003 | Cromer et al. ................ 713/193 |
| 2004/0252613 | A1* | 12/2004 | Iwakiri ....................... 369/53.12 |
| 2006/0294364 | A1* | 12/2006 | Sasabe ......................... 713/155 |
| 2008/0061971 | A1 | 3/2008 | Lin |

FOREIGN PATENT DOCUMENTS

| CN | 1845083 A | 10/2006 |
| CN | 1864117 A | 11/2006 |
| TW | I230888 B | 4/2005 |
| TW | M307161 Y | 3/2007 |

* cited by examiner

*Primary Examiner* — Jeffery Williams
*Assistant Examiner* — Suman Debnath
(74) *Attorney, Agent, or Firm* — WPAT, PC; Justin King

(57) ABSTRACT

An exemplary flat panel display includes a micro processing unit, a display signal input socket defining a safeguarding terminal, an input interface configured for a user to input a user code, a first storage unit storing a security code, and a second storage unit storing a safeguarding mark. The micro processing unit is configured to monitor a voltage applied to the safeguarding terminal, detect a status of the safeguarding mark, compare the user code with the security code according to the status of the safeguarding mark, and output a control signal according to a result of the comparison.

14 Claims, 1 Drawing Sheet

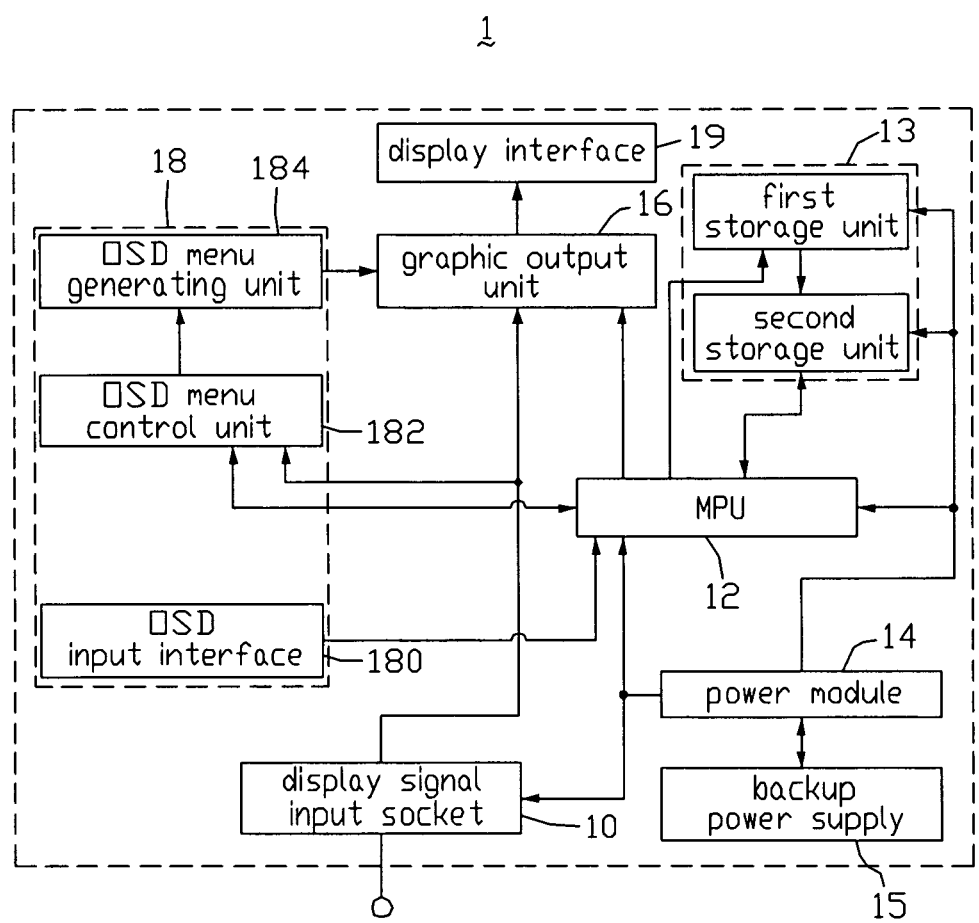

FLAT PANEL DISPLAY WITH DISPLAY SIGNAL INPUT SOCKET HAVING SAFEGUARDING TERMINAL

FIELD OF THE INVENTION

The present invention relates to a flat panel display (FPD) that includes a display signal input socket having a safeguarding terminal.

GENERAL BACKGROUND

Recently, flat panel displays that are light and thin and have low power consumption characteristics have been widely used in office automation equipment, video units, and the like. However, because of their portability and low weight, some flat panel displays may be easily stolen. For similar reasons, some flat panel displays can be easily taken away from their proper location and used elsewhere without authorization.

What is needed, therefore, is a flat panel display that can circumvent, overcome or at least mitigate the above-described problems.

SUMMARY

In an exemplary embodiment, a flat panel display includes a micro processing unit, a display signal input socket defining a safeguarding terminal, an input interface configured for a user to input a user code, a first storage unit storing a security code, and a second storage unit storing a safeguarding mark. The micro processing unit is configured to monitor a voltage applied to the safeguarding terminal, detect a status of the safeguarding mark, compare the user code with the security code according to the status of the safeguarding mark, and output a control signal according to a result of the comparison.

Other aspects, novel features and advantages will become more apparent from the following detailed description when taken in conjunction with the accompanying drawing.

BRIEF DESCRIPTION OF THE DRAWING

The drawing is a block diagram of a flat panel display according to an exemplary embodiment of the present invention.

DETAILED DESCRIPTION OF PREFERRED EMBODIMENTS

Reference will now be made to the drawing to describe preferred and exemplary embodiments of the present invention in detail.

Referring to the drawing, a flat panel display 1 according to an exemplary embodiment of the present invention is shown. The flat panel display 1 includes a display signal input socket 10, an MPU (micro processing unit) 12, a firmware unit 13, a backup power supply 15, a graphic output unit 16, an OSD (on screen display) assembly 18, a display interface 19, and a power module 14. The power module 14 serves to convert voltages from an external power supply (not shown) to voltages capable of driving the flat panel display 1.

The display signal input socket 10 receives a display signal from a display signal output socket (not shown) of another device, for example an external host (not shown), and sends the display signal to the graphic output unit 16. The graphic output unit 16 receives and converts the display signal, and sends the converted display signal to the display interface 19.

The OSD assembly 18 includes an OSD input interface 180, an OSD menu control unit 182, and an OSD menu generating unit 184. In one embodiment, the MPU 12, the firmware unit 13, the graphic output unit 16, the OSD menu control unit 182, and the OSD menu generating unit 184 are integrated in a PCB (printed circuit board, not shown) as a single unit of the flat panel display 1. The OSD input interface 180 can for example include a group of control buttons (not shown). The control buttons can be touched or pressed by a user from outside of the flat panel display. That is, the control buttons can generate demand signals according to corresponding operations of a user, and send the demand signals to the MPU 12.

The display signal input socket 10 is a DVI-D (digital visual interface, type D) socket, and generally includes twenty-four first conductive terminals (not shown). The display signal output socket includes twenty-four second conductive terminals (not shown). A data wire (not shown) including twenty-four conductive pins at each end thereof interconnects the display signal input socket 10 and the display signal output socket. Thus, the first conductive terminals are respectively connected to the second conductive terminals via the data wire. One of the first conductive terminals is defined as a safeguarding terminal. The safeguarding terminal is connected to the power module 14 and the MPU 12. When the flat panel display 1 works normally, the safeguarding terminal is grounded via the data wire. The MPU 12 periodically detects a voltage applied to the safeguarding terminal. In an alternative embodiment, the display signal input socket 10 can be a VGA (video graphics array) socket.

The firmware unit 13 can for example be an EEPROM (electrically erasable programmable read-only memory) unit. The firmware unit 13 has a POST (power-on self test) program stored, therein, and further includes a first storage unit (not labeled) and a second storage unit (not labeled). The first storage unit stores a security code. The security code may be a default code stored in the first storage unit when the flat panel display 1 is manufactured. The security code is preset to be unable to be null. The second storage unit stores a safeguarding mark that represents whether a safeguarding function of the flat panel display 1 is activated or not. A default setting of the safeguarding mark is "valid."

The safeguarding function of the flat panel display 1 can be activated via the OSD input interface 180. In detail, the MPU 12 receives an activation signal from the OSD input interface 180, generates a prompt signal and sends the prompt signal to the OSD menu control unit 182, and detects the safeguarding mark. The OSD menu control unit 182 receives the prompt signal, and the OSD menu generating unit 184 generates a menu signal for displaying a prompt dialogue on the display interface 19. The prompt dialogue advises the user that an operation of activating the safeguarding function of the flat panel display 1 is under way. If the safeguarding mark is "invalid," the MPU 12 generates a mark setting signal to set the safeguarding mark as valid, and also generates a dialogue signal for displaying a dialogue on the display interface 19. The dialogue advises the user that the safeguarding function of the flat panel display 1 is now activated. If the safeguarding mark is valid, the MPU 12 generates a dialogue signal for displaying a dialogue on the display interface 19. The dialogue advises the user that the safeguarding function of the flat panel display 1 has been already activated.

A procedure of deactivating the safeguarding function of the flat panel display 1 is similar to the above-described activation procedure. In detail, the MPU 12 receives a deactivation signal from the OSD input interface 180, generates a prompt signal and sends the prompt signal to the OSD menu control unit 182, and detects the safeguarding mark. The OSD menu control unit 182 receives the prompt signal, and generates a menu signal and sends the menu signal to the OSD menu generating unit 184 for displaying a prompt dialogue on the display interface 19. The prompt dialogue advises the user that an operation of deactivating the safeguarding function of the flat panel display 1 is under way. If the safeguarding mark is invalid, the MPU 12 generates a notice signal for displaying a dialogue on the display interface 19. The dialogue advises the user that the safeguarding function of the flat panel display 1 has not been activated yet. If the safeguarding mark is valid, this means the safeguarding function of the flat panel display 1 is currently activated. Accordingly, the MPU 12 generates a confirmation signal for displaying a confirmation dialogue on the display interface 19. The confirmation dialogue requests the user to input a user code matching the security code. The user code can be input via the OSD input interface 180, or via an external input device (not shown) such as a remote controller. When the user code is input and sent to the MPU 12, the MPU 12 compares the user code with the security code. If the user code does not match the security code, the MPU 12 generates another confirmation signal for redisplaying the confirmation dialogue on the display interface 19. This process may be repeated a number of times until the correct user code is input. If the user code matches the security code, the MPU 12 generates a mark setting signal to set the safeguarding mark as invalid, and also generates a dialogue signal for displaying a dialogue on the display interface 19. The dialogue advises the user that the safeguarding function of the flat panel display 1 has now been deactivated.

Similar to the above-described deactivation procedure, the security code can be modified only after the correct user code is input in an operation of modifying the security code.

When the display signal input socket 10 of the flat panel display 1 is disconnected from the display signal output socket, for example when the data wire is unplugged, the safeguarding terminal is disconnected from the data wire, and the MPU 12 detects that the voltage applied to the safeguarding terminal has become a high-level voltage. The MPU 12 detects the safeguarding mark, and generates the mark setting signal to set the safeguarding mark as valid if the safeguarding mark is invalid. Thus, the safeguarding function of the flat panel display 1 is automatically activated. In addition, if the safeguarding mark is invalid and the flat panel display 1 is disconnected from the external power supply first, the backup power supply 15 connected to the power module 14 automatically provides power for the MPU 12 and the firmware unit 13 until the safeguarding mark is set as valid. The backup power supply 15 can be, for example, a rechargeable battery that can be charged by the power module 14 when the flat panel display 1 normally works. In another example, the backup power supply 15 can be a mini UPS (uninterruptible power system).

When the flat panel display 1 is connected to an external display signal input socket (not shown) again or is powered on again, the MPU 12 runs the POST program, and detects the safeguarding mark. Because the safeguarding mark has already been set as valid (see above), the MPU 12 generates the confirmation signal for displaying the confirmation dialogue on the display interface 19. The confirmation dialogue requests the user to input the correct user code. After the correct user code is input, the MPU 151 generates a normal work signal to make the flat panel display 1 normally operable. If an incorrect user code is input, the MPU 12 generates another confirmation signal and sends the confirmation signal to the OSD menu control unit 182. The OSD menu control unit 182 receives the confirmation signal, and generates a corresponding OSD menu displayed on the display interface 19. The confirmation signal advises the user that the input user code is incorrect, and requests the user to re-input the correct user code. If the input user code continuously does not match the security code a predetermined threshold number of times, for example five times, the MPU 12 generates a shut down signal to shut down the flat panel display 1.

In summary, if the flat panel display 1 is stolen or taken away without authorization, the safeguarding function of the flat panel display 1 is automatically activated. Accordingly, a user code matching the security code will need to be input in order to make the flat panel display 1 work normally. It is believed that such kind of flat panel display 1 with the above-described safeguarding function can help deter people from stealing the flat panel display 1 or using the flat panel display 1 without authorization. That is, the safeguarding function makes the flat panel display 1 more secure.

In alternative embodiments, the flat panel display 1 may instead be another kind of display.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A flat panel display comprising:
   a micro processing unit (MPU);
   a display signal input socket defining a safeguarding terminal, the safeguarding terminal to be connected with a signal generating device, the safeguarding terminal having a first voltage when it is connected with the signal generating device and having a second voltage when it is unplugged from a display signal output socket of the signal generating device to disconnect with the signal generating device;
   an input interface configured for a user to input a user code;
   a first storage unit storing a security code;
   a second storage unit storing a safeguarding mark;
   a power module connected to said first storage unit, said second storage unit, and said MPU; and
   a backup power supply connected to said power module;
   wherein said backup power supply is configured to automatically provide power for said MPU, said first storage unit, and said second storage unit when said safeguarding mark is invalid until said safeguarding mark is valid, the MPU is configured to monitor the voltage applied to the safeguarding terminal, when the MPU monitors that the voltage of the safeguard terminal changes from the first voltage to the second voltage, the MPU changes a status of the safeguarding mark, the MPU compares the user code with the security code according to the status of the changed safeguarding mark, and outputs a control signal according to a result of the comparison.

2. The flat panel display of claim 1, wherein the MPU is further configured to launch an input dialogue displayed on the input interface inviting a user to input the user code, and subsequently compare the user code with the security code, if the safeguarding mark is valid.

3. The flat panel display of claim 1, wherein the control signal makes the flat panel display be normally operable if the user code matches the security code.

4. The flat panel display of claim 1, wherein the control signal shuts down the flat panel display if the user code does not match the security code a predetermined threshold number of times.

5. The flat panel display of claim 1, wherein the security code is modifiable by way of user input at the user interface, such input including inputting of a user code.

6. The flat panel display of claim 5, wherein the security code is modified only if the input user code matches the to-be-modified security code.

7. The flat panel display of claim 1, wherein the security code is preset to be unable to be null.

8. The flat panel display of claim 1, further comprising an on screen display (OSD) assembly, the OSD assembly comprising the input interface, an OSD menu control unit, and an OSD menu generating unit, the OSD menu control unit being connected to the MPU, the OSD generating unit being connected to the OSD menu control unit.

9. The flat panel display of claim 1, wherein the input interface is operable by a user to generate demand signals, and is configured to send the demand signals to the MPU.

10. The flat panel display of claim 1, wherein the backup power supply is a rechargeable battery.

11. The flat panel display of claim 3, wherein when the flat panel display is powered on and the safeguarding mark is valid, the flat panel display is normally operable only if the correct user code is input.

12. A display capable of connecting with a signal generating device for receiving image signals, the display comprising:
 a display signal input socket defining a safeguarding terminal, the safeguarding terminal to be connected to the signal generating device, the safeguarding terminal having a first voltage when it is connected with the signal generating device and having a second voltage when it is unplugged from a display signal output socket of the signal generating device to disconnect with the signal generating device;
 a micro processing unit (MPU) monitoring the voltage of the safeguarding terminal;
 an input interface configured for a user to input a user code;
 a first storage unit configured for providing a security code;
 a second storage unit configured for providing a safeguarding mark, the safeguarding mark being changeable between a first code and a second code, the first code representing that a safeguarding function of the display is activated, the second code representing that the safeguarding function is not activated;
 a power module connected to said MPU, said first storage unit, and said second storage unit; and
 a backup power supply connected to said power module;
 wherein when the MPU monitors that the voltage of the safeguarding terminal changes from the first voltage to the second voltage, the MPU sets the safeguarding mark to be the first code, the safeguarding function of the display is correspondingly activated, when the display is powered on again, the user code matching the security code needs to be input in order to make the display operable if the safeguarding mark is set as the first code; and
 wherein said backup power supply is configured to automatically provide power to said power module for said MPU, said first storage unit, and said second storage unit when said safeguarding mark is set as said second code until said safeguarding mark is set as said first code.

13. A display capable of connecting with a signal generating device for receiving image signals, the display comprising:
 a safeguarding terminal to be connected with the signal generating device, the safeguarding terminal having a first voltage when it is connected with the signal generating device and having a second voltage when it is unplugged from a display signal output socket of the signal generating device to disconnect with the signal generating device;
 a first storage unit storing a safeguarding mark, the safeguarding mark being changeable between a first code and a second code, the first code representing that a safeguarding function of the display is activated, the second code representing that the safeguarding function is not activated;
 a processing unit monitoring the voltage of the safeguarding terminal, and setting the safeguarding mark to be the first code when the processing unit monitors that the voltage of the safeguarding terminal changes from the first voltage to the second voltage, thereby the safeguarding function of the display being activated;
 a power module connected to said MPU and a storage unit; and
 a backup power supply connected to said power module;
 wherein said backup power supply is configured to automatically provide power to the power module for said MPU and said storage unit when said safeguarding mark is set as said second code until said safeguarding mark is set as said first code.

14. The display of claim 13, further comprising an input interface configured for a user to input a user code, and a second storage unit storing a security code, wherein when the display is powered on again, the user code matching the security code needs to be input in order to make the display work normally if the safeguarding mark is set as the first code.

* * * * *